United States Patent
Lee et al.

(10) Patent No.: US 9,407,147 B2
(45) Date of Patent: Aug. 2, 2016

(54) MULTIPHASE CONVERTER CONTROLLER WITH CURRENT BALANCE

(71) Applicant: GREEN SOLUTION TECHNOLOGY CO., LTD., New Taipei (TW)

(72) Inventors: Li-Min Lee, New Taipei (TW); Quan Gan, Wuxi (CN); Shian-Sung Shiu, New Taipei (TW); Chao Shao, Wuxi (CN)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 82 days.

(21) Appl. No.: 13/845,117

(22) Filed: Mar. 18, 2013

(65) Prior Publication Data

US 2014/0266111 A1 Sep. 18, 2014

(51) Int. Cl.
 *H02M 3/156* (2006.01)
 *H02M 3/158* (2006.01)

(52) U.S. Cl.
 CPC .................. *H02M 3/1584* (2013.01)

(58) Field of Classification Search
 CPC ... H02M 3/156; H02M 3/157; H02M 3/1584; H02M 2001/0045; G05F 1/59; G05F 3/24
 USPC ......... 323/222, 265, 268, 269, 271, 282, 283, 323/284, 285, 288, 351
 See application file for complete search history.

(56) References Cited

U.S. PATENT DOCUMENTS

| | | | | |
|---|---|---|---|---|
| 6,819,088 B2* | 11/2004 | Shenai et al. | ................. | 323/222 |
| 8,324,875 B2* | 12/2012 | Miki | ................... | H02M 3/1584 323/272 |
| 8,350,545 B2* | 1/2013 | Huang | ................ | H02M 3/1584 323/272 |
| 8,358,113 B2* | 1/2013 | Cheng et al. | ................... | 323/272 |
| 8,618,788 B2* | 12/2013 | Trivedi | ................ | H02M 3/1584 323/241 |
| 8,901,901 B2* | 12/2014 | Ziegler | ................ | H02M 3/1584 323/271 |
| 2004/0046535 A1 | 3/2004 | Duffy et al. | | |
| 2005/0010825 A1 | 1/2005 | Pullen et al. | | |
| 2005/0184717 A1 | 8/2005 | Walters | | |

(Continued)

FOREIGN PATENT DOCUMENTS

| CN | 101040424 | 9/2007 |
|---|---|---|
| CN | 101286698 | 10/2008 |

(Continued)

OTHER PUBLICATIONS

STIC EIC 2800 search report from searcher Eileen Patton.*

(Continued)

*Primary Examiner* — Timothy J Dole
*Assistant Examiner* — Htet Z Kyaw
(74) *Attorney, Agent, or Firm* — Jianq Chyun IP Office

(57) ABSTRACT

A multiphase converter controller with current balance, configured to control a plural converting circuit to commonly supply an output voltage, is disclosed. The multiphase converter controller comprises a feedback circuit, a fixed on-time circuit, and a multiphase logical circuit. The feedback circuit detects the output voltage to generate a feedback control signal. The fixed on-time circuit generates an on-time signal according to the feedback control signal, and a pulse width of the on-time signal is determined according to a single timer. The multiphase logical circuit chooses a corresponding converting circuit, generates a phase signal according to a sequence of the feedback control signal and controls the corresponding converting circuit according to the on-time signal. Wherein, the fixed on-time circuit determines a correction value according to currents of the plural converting circuit and the phase signal, so as to correct the pulse width of the on-time signal.

7 Claims, 5 Drawing Sheets

(56) References Cited

U.S. PATENT DOCUMENTS

| | | | |
|---|---|---|---|
| 2010/0033154 A1* | 2/2010 | Cheng | H02M 3/1584 323/293 |
| 2014/0300331 A1* | 10/2014 | Trimeloni et al. | 323/272 |

FOREIGN PATENT DOCUMENTS

| | | |
|---|---|---|
| CN | 101656419 | 2/2010 |
| TW | 201008122 | 2/2010 |
| TW | I357720 | 2/2012 |
| TW | 201210179 | 3/2012 |

OTHER PUBLICATIONS

"Office Action of China Counterpart Application", issued on Nov. 24, 2015, p. 1-p. 6.

* cited by examiner

MULTIPHASE CONVERTER CONTROLLER WITH CURRENT BALANCE

BACKGROUND OF THE INVENTION (1) Field of the Invention

The present relates to a multiphase converter controller, and more particularly relates to a multiphase converter controller with current balance.

(2) Description of the Prior Art

With the evolution of the process technology, the integrated circuit becomes gradually miniaturized while the driving voltage being reduced. However the power consumption of the integrated circuits in some field is not reduced with the reduction proportion of driving voltage. It results in that the operating current of the integrated circuit reversely increases.

A power supply for driving the integrated circuit is mainly supplied by a switching power supply. A switch operating of the switching power supply causes a voltage ripple in the supplied voltage. These voltage ripples is more obvious when the driving voltage of the integrated circuits lower, and even causes erroneous operation of the integrated circuit. For decreasing the voltage ripple of the switching power supply, a multiphase technology is developed. The multiphase technology transmits the power to the output end of the DC-DC converting circuit by the channels, so as to share the power with the multi-channel and reduce the amount of the voltage ripple.

Referring to FIG. 1, FIG. 1 is a schematic diagram of a conventional multiphase converter circuit. The multiphase converter circuit comprises a controller 10 and three channels 12a~12c. Each of the channels 12a~12c comprises two transistor switches connected in series between the input voltage Vin and the ground. Drivers of the channels 12a~12c respectively receive pulse width modulating control signals PWM1~PWM3 generated by the controller 10 and accordingly switch the corresponding transistor switches to provide channel currents Io1~Io3.

The channel currents Io1~Io3 commonly form an output current Io to charge a capacitance Co to generate an output voltage Vout for driving a load. The controller 10 detects the channel currents Io1~Io3 through pin pairs CSP1 and CSN1, CSP2 and CSN2, and CSP3 and CSN3, and receives a voltage detecting signal FB and accordingly modulates the duty cycle of the transistor switches of the channels 12a~12c.

The channel currents are imbalance due to mismatch between components of the channels, such as transistor switches and inductances. The current imbalance decreases the life-span and reliability of the components. The controller 10 adjusts the amount of every channel current Io1~Io3 to be balance according to the detecting signals of the pin pairs CSP1 and CSN1, CSP2 and CSN2 and CSP3 and CSN3. In general, the controller 10 first gets a reference duty cycle of every channel acquires by error amplifiers executing a feedback control, and then pulse width control circuits of the channels respectively compensates the reference duty cycle and according to the current different between channel currents.

The error amplifier has good noise rejection capability, but its transient response is poor to rapidly respond to the variation of the loading. Furthermore, the conventional multiphase converter circuit having the plural pulse width control circuit has the problems of complex circuit, larger die size and high cost, and further mismatch between the pulse width control circuits. The problems affect the definition of the channel current balance.

SUMMARY OF THE INVENTION

The conventional multiphase converter circuit has the problems of the poor transient response, the complex circuit, the high cost and the poor definition of the current balance. The invention uses the fixed on-time control technology to improve the transient response of the circuit and uses a single timer for determining on-time periods of the channels to reduce the cost and the complexity in circuit design, and simultaneously avoid the mismatch problems to improve the definition of the current balance.

To accomplish the aforementioned and other objects, the present invention provides a multiphase converter controller with current balance, adapted to control a plural converting circuit to commonly supply an output voltage. The multiphase converter controller comprises a feedback circuit, a fixed on-time circuit and a multiphase logic circuit. The feedback circuit detects the output voltage for generating a feedback control signal. The fixed on-time circuit generates an on-time signal according to the feedback control signal, and a pulse width of the on-time signal is determined according to the single timer. The multiphase logical circuit chooses a corresponding converting circuit among the plural converting circuit and generates a phase signal both according to a sequence of the feedback control signal. Wherein, the fixed on-time circuit determines a correction value according to currents of the plural converting circuit and the phase signal, so as to correct the pulse width of the on-time signal.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
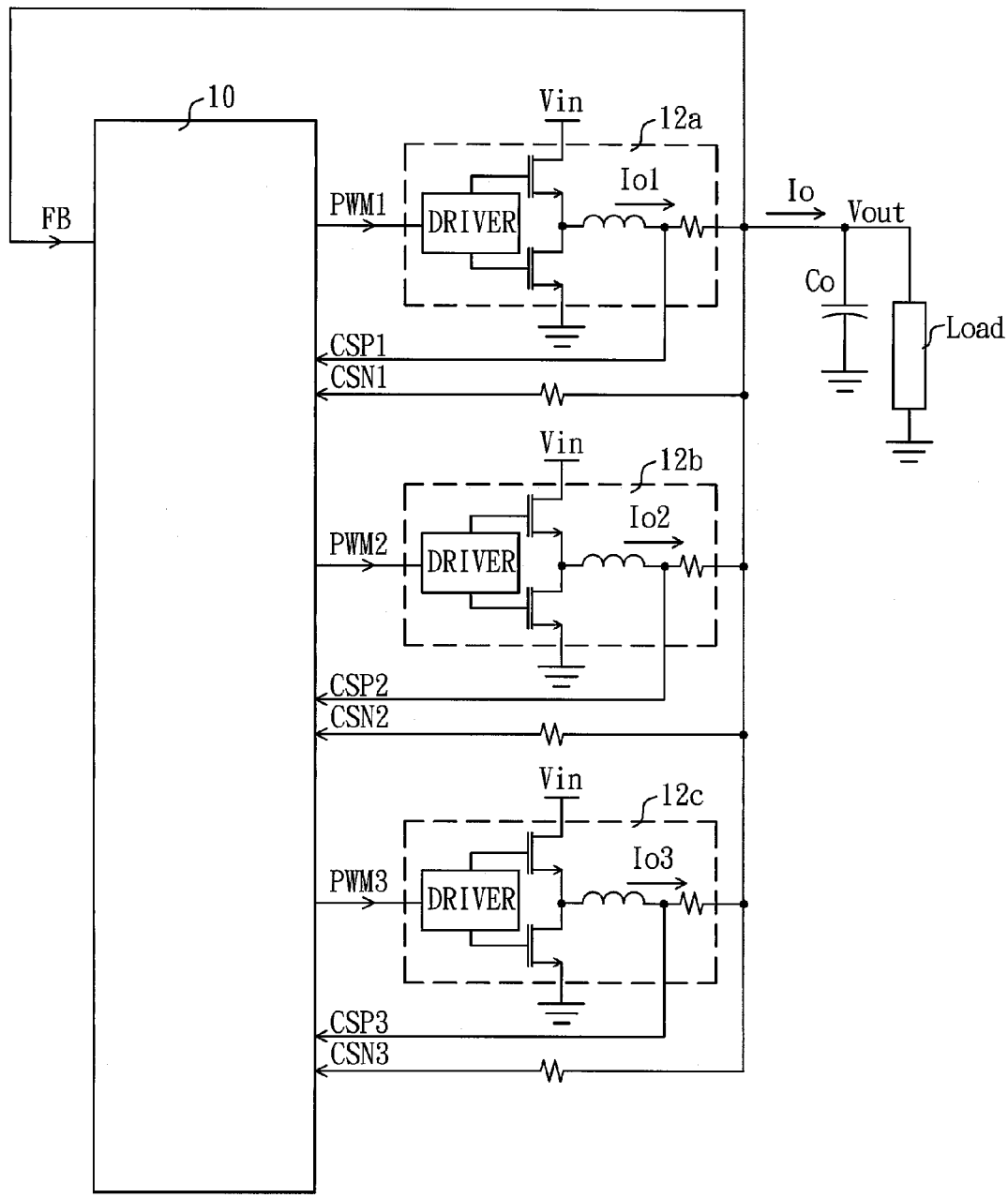
FIG. 1 is a schematic diagram of a conventional multiphase converter circuit.
Figure 2:
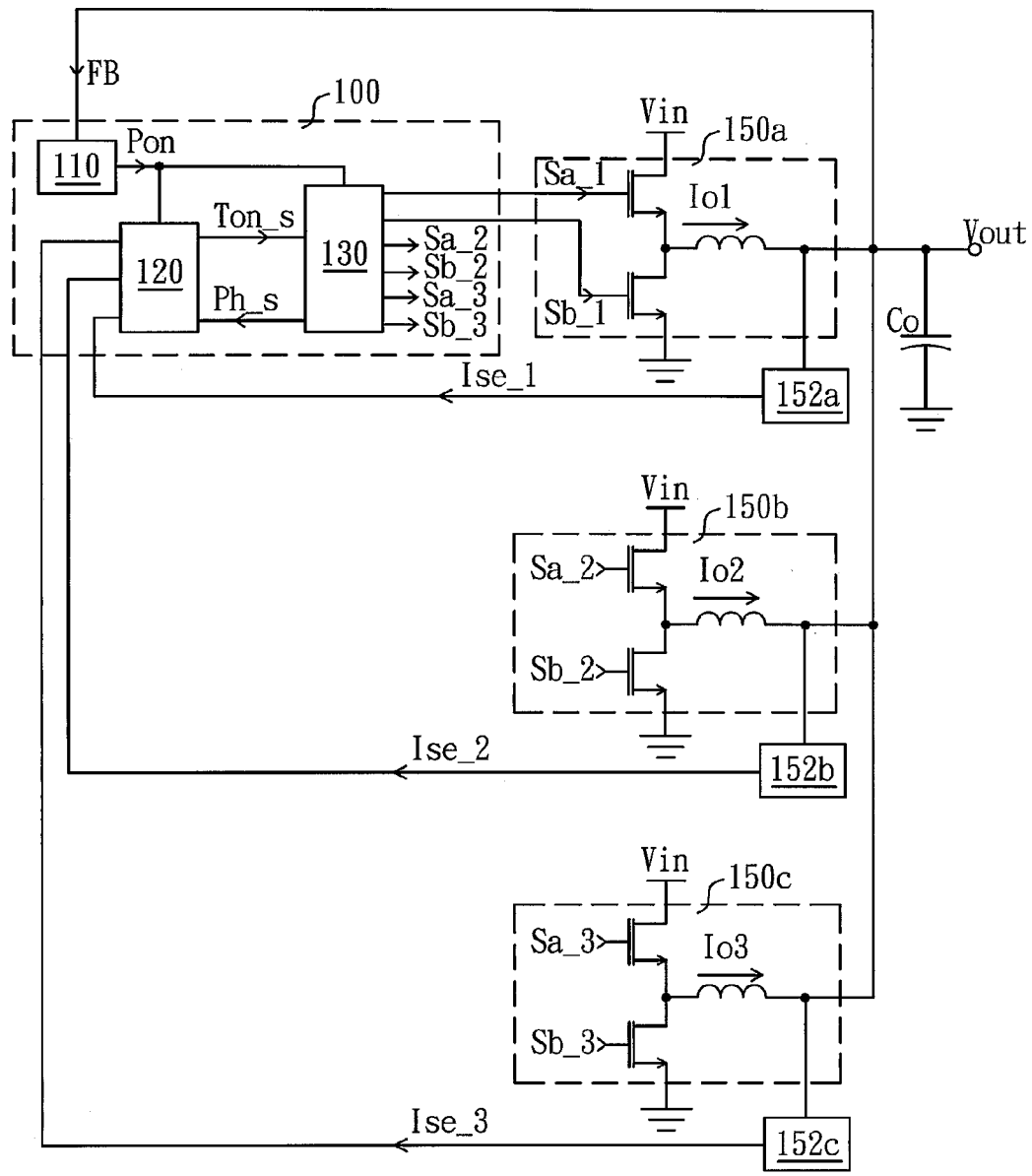
FIG. 2 is a schematic diagram of a multiphase converter circuit with current balance according to a preferred embodiment of the present invention.

FIG. 2 is a schematic diagram of a multiphase converter circuit with current balance according to a preferred embodiment of the present invention. The multiphase converter controller 100 controls a plural converting circuit 150a~150c to commonly supply an output voltage Vout. The converting circuits of the present embodiment are DC-DC buck converter circuits. Each of the DC-DC buck converter circuit comprises an upper side transistor, a lower side transistor and an inductance. The upper side transistor is coupled to an input voltage Vin, and transmits the power from the input voltage Vin to store in a capacitance Co according to the control of the multiphase converter controller 100. The multiphase converter controller 100 comprises a feedback circuit 110, a fixed on-time circuit 120 and a multiphase logical circuit 130. The feedback circuit 110 is coupled to the output voltage Vout and receives a voltage detecting signal FB indicative of the output voltage Vout, and accordingly generates a feedback control signal Pon. The multiphase logical circuit 130 chooses a corresponding converting circuit among the plural converting circuit 150a~150c according to a sequence of the feedback control signal Pon and generates a phase signal Ph_s. The current detecting circuits 152a~152c respectively detect the channel currents Io1~Io3 flowing through the inductances of the converting circuits 150a~150c to generate current detecting signals Ise_1~Ise_3 indicative of the amount of the channel currents Io1~Io3. The fixed on-time circuit 120 generates an on-time signal Ton_s according to the feedback control signal Pon and a pulse width of the on-time signal Ton_s is determined according to a single timer. (Please refer to the following embodiments.) The fixed on-time circuit 120 further receives the current detecting signals Ise_1~Ise_3 and determines which converting circuit to be controlled in this cycle according to the phase signal Ph_s. Then, the fixed on-time circuit 120 accordingly determines a correction value to correct the pulse width of the on-time signal Ton_s. The multiphase logical circuit 130 determines an on-time period according to the on-time signal Ton_s and generates the corresponding control signals of control signals Sa_1~Sa_3 and Sb_1~Sb_3 to control the corresponding converting circuit. Wherein the control signals Sa_1~Sa_3 are configured to control the upper side transistors of the corresponding converting circuits, and the control signals Sb_1~Sb_3 are configured to control the lower side transistors of the corresponding converting circuit.

Due to the fixed on-time circuit 120 of the present embodiment only has the single timer. Hence, the complication and cost of the circuit is lower than the conventional circuit. Moreover, to use the single timer can avoid the mismatch among several timers. Therefore, the channel currents of the converting circuits in the present invention are more balance to avoid shortening the life-spans of the components due to current unbalance.

Figure 3:
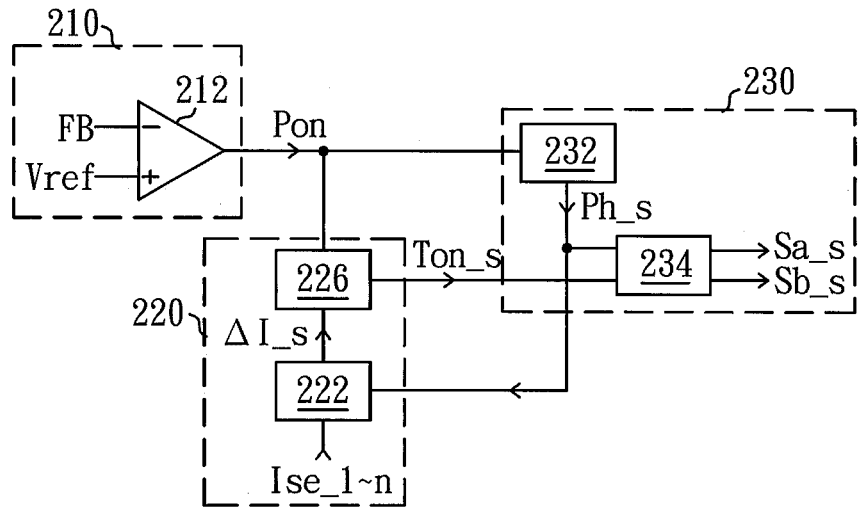
FIG. 3 is a schematic diagram of a multiphase converter controller with current balance according to a first preferred embodiment of the present invention.

FIG. 3 is a schematic diagram of a multiphase converter controller with current balance according to a first preferred embodiment of the present invention. The multiphase converter controller comprises a feedback circuit 210, a fixed on-time circuit 220 and a multiphase logical circuit 230. The feedback circuit 210 comprises a comparator 212. A non-inverting input end of the comparator 212 receives a reference voltage Vref and an inverting end thereof receives a voltage detecting signal FB. The comparator 212 outputs a feedback control signal Pon according to the comparing result. The feedback control signal Pon is a high level when a voltage level of the voltage detecting signal FB is lower than the reference voltage Vref. The multiphase logical circuit 230 comprises a phase judging circuit 232 and a multiphase driver 234. The phase judging circuit 232 receives and counts a number of the times of the high level of the feedback control signal Pon, and determines which converting circuit to be controlled in this cycle according to the counted result and simultaneously outputs a phase signal Ph_s. The fixed on-time circuit 220 comprises an error current generating circuit 222 and a timer 226. The error current generating circuit 222 receives current detecting signals Ise_1~n indicative of the channel currents for determining a target value. The error current generating circuit 222 simultaneously receives the phase signal Ph_s to determine a different of the current detecting signal of the corresponding converting circuit and the target value, and accordingly generates an adjusting current signal ΔI_s. The timer 226 receives the feedback control signal Pon and accordingly starts a time-counting procedure for generating an on-time signal Ton_s, and simultaneously adjusts a pulse width of the on-time signal Ton_s according to the adjusting current signal ΔI_s. The multiphase driver 234 receives the phase signal Ph_s and on-time signal Ton_s, and generates control signals Sa_s and Sb_s for controlling the corresponding converting circuit according to the phase signal Ph_s. The on-time period in this cycle, i.e., the pulse width of the control signal Sa_s, is determined according to the on-time signal Ton_s.

According to the above described, the fixed on-time circuit 220 of the present invention adjusts the pulse width of the on-time signal Ton_s in this cycle in response to the adjusting value of the channel current determined according to the current detecting signal Ise_1~n. For example, the channel current is smaller and then the pulse width of the corresponding on-time signal Ton_s is lengthened, and the channel current is larger and then the pulse width of the corresponding on-time signal Ton_s is shortened. In next cycle, the multiphase converter controller controls the next converting circuit, and the fixed on-time circuit 220 adjusts the pulse width of the on-time signal Ton_s for the next converting circuit again according to the phase signal Ph_s and the current detecting signal Ise_1~n. Because of the conduction time of each channel of the converting circuit is staggered and not overlapped, so the fixed on-time circuit 220 can use the single timer to handle the on-time signal Ton_s for all the converting circuits. Thus, the present invention can avoid the mismatch problems among several timers.

Figure 4:
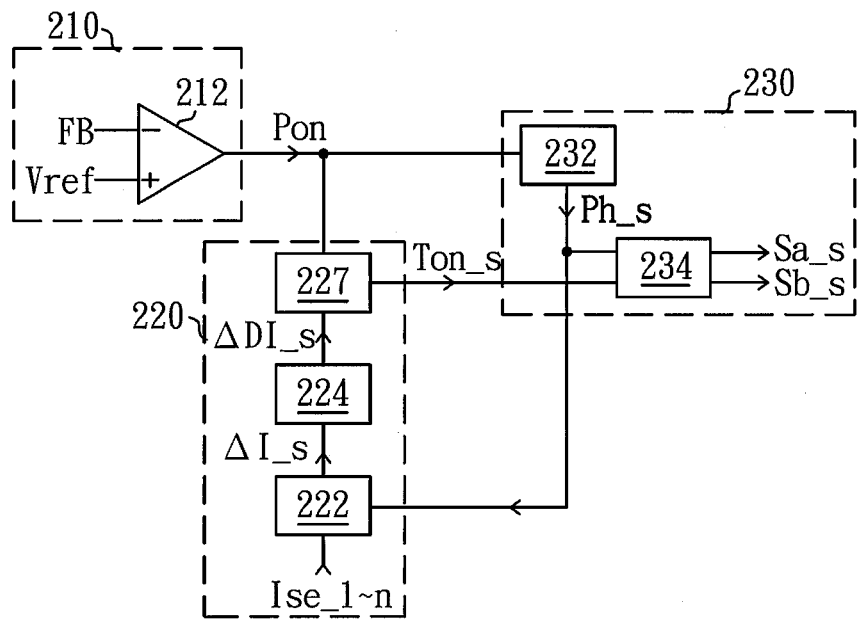
FIG. 4 is a schematic diagram of a multiphase converter controller with current balance according to a second preferred embodiment.

FIG. 4 is a schematic diagram of a multiphase converter controller with current balance according to a second preferred embodiment. Compared with the embodiment shown in FIG. 3, the fixed on-time circuit 220 of the present embodiment further comprises an analogy-digital converting circuit 224, configured to transform the adjusting current signal ΔI_s generated by the error current generating circuit 222 to a digital adjusting current signal ΔDI_s. Then, a digital timer 227 adjusts the pulse width of the on-time signal Ton_s the digital form.

Figure 5:
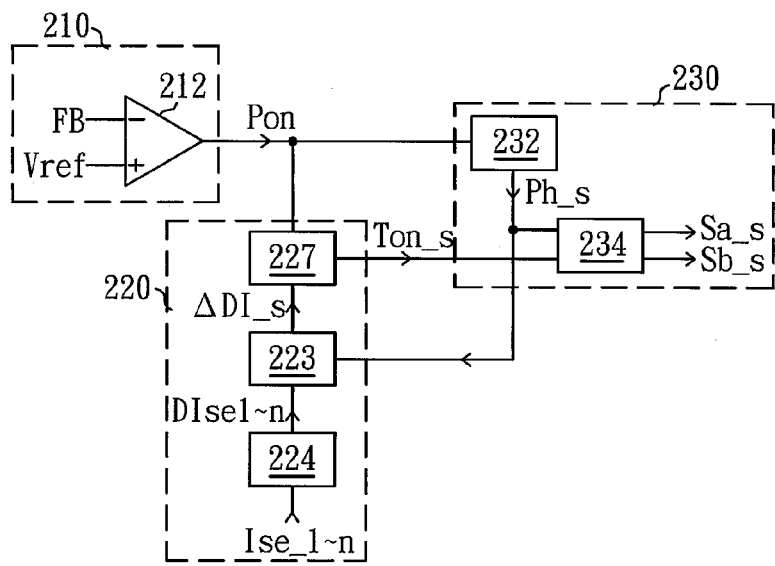
FIG. 5 is a schematic diagram of a multiphase converter controller with current balance according to a third preferred embodiment of the present invention.

Referring to FIG. 5, FIG. 5 is a schematic diagram of a multiphase converter controller with current balance according to a third preferred embodiment of the present invention. Compared with the embodiment shown in FIG. 4, the analogy-digital converting circuit 224 is arranged before changing to a digital error current generating circuit 223 to transform the current detecting signal Ise_1~n into the digital current detecting signal DIse_1~n. The error current generating circuit 223 generates the digital adjusting current signal ΔDI_s according to the digital current detecting signal DIse_1~n and the phase signal Ph_s. Then, the digital timer 227 adjusts the pulse width of the on-time signal Ton_s by digital processing.

Figure 6:
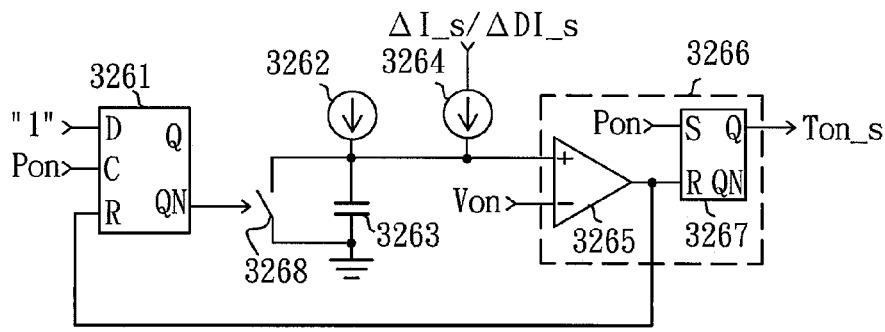
FIG. 6 is a schematic diagram of a timer according to a first preferred embodiment of the present invention.

FIG. 6 is a schematic diagram of a timer according to a first preferred embodiment of the present invention. The timer comprises a D-type flip-flop 3261, a current supplying circuit, a capacitance 3263, a pulse width controller 3266 and a switch 3268. An input end D of the D-type flip-flop 3261 receives a signal with logical level"1", an input end C thereof receives the feedback control signal Pon, and a reset end R thereof is coupled to the pulse width controller 3266. Referred to FIG. 3, the feedback control signal Pon is at high level when the voltage level of the voltage detecting signal FB is lower than the reference voltage Vref. At the moment, the D-type flip-flop 3261 is triggered to output an output signal at an output end Q having a logic level "1" being as same as the signal received by the input end D, and an output signal at an inverting output end QN having an opposite logic level "0". Thus, the switch 3268 is cut off, and the current supplying circuit starts to charge the capacitance 3263. The current supplying circuit comprises a constant current source 3262 and an adjusting current source 3264. The constant current source 3262 provides a constant current, and the adjusting current source 3264 generates an adjusting current according to the adjusting current signal ΔI_s or the digital adjusting current signal ΔDI_s, described as the above mentioned embodiment. Therefore, a charging current supplied by the current supplying circuit is the sum of the constant current source and the current supplied by the adjusting current source 3264, and the charging current is determined according the phase signal Ph_s and the adjusting current signal ΔI_s or the current detecting signal DIse_1~n.

The pulse width controller 3266 comprises a comparator 3265 and a SR flip-flop 3267. An input end S of the RS flip-flop 3267 receives the feedback control signal Pon, and an output end Q thereof outputs the on-time signal Ton_s with high level when the feedback control signal Pon is at high level. In other words, the feedback control signal Pon determines a start point in time of the on-time signal Ton_s. Please refer to FIG. 5, the multiphase controller 230 starts to turn on the corresponding converting circuit to raise the voltage level of the voltage detecting signal FB to be higher than the reference voltage Vref and then the feedback control signal Pon change to be at the low level. An inverting end of the comparator 3265 receives an on-time reference voltage Von and a non-inverting end thereof is coupled to the capacitance 3263. When a voltage of the capacitance 3263 is higher than the on-time reference voltage Von, the comparator 3265 outputs a high level signal to a reset end R of the RS flip-flop 3267 to make the SR flip-flop 3267 stop outputting the on-time signal Ton_s. In other words, an end point in time of the on-time signal Ton_s is determined by the on-time reference voltage Von and the voltage of the capacitance 3263. At this moment, the D-type flip-flop 3261 is reset to make the inverting output end QN output a signal with high logical level of "1". Thus, the switch 3268 is turned on and makes the voltage of the capacitance 3263 to be returned to zero for next cycle starting, i.e., the feedback control signal Pon again returns to the high level.

Figure 7:
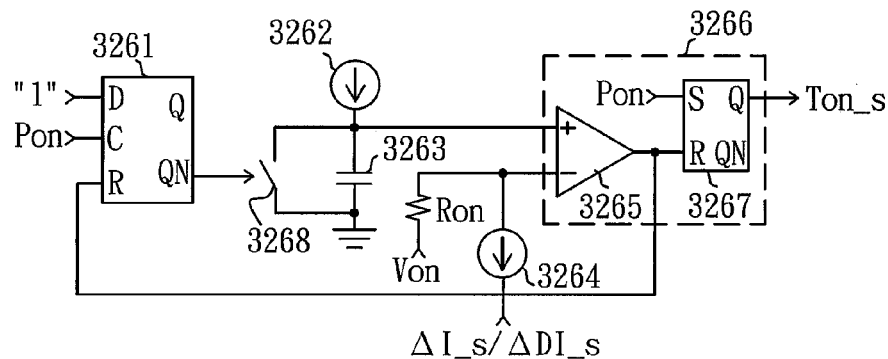
FIG. 7 is a schematic diagram of a timer according to a second preferred embodiment of the present invention.

The present invention also adjusts the pulse width of the on-time signal Ton_s by adjusting the level of the on-time reference voltage Von. FIG. 7 is a schematic diagram of a timer according to a second preferred embodiment of the present invention. Compared with the embodiment shown in FIG. 6, the adjusting current source 3264 is coupled to the on-time reference voltage Von through a resistor Ron, and so the voltage received by the inverting end of the comparator 3265 is varied with a resistance of the resistor Ron. Wherein the voltage drop of the resistor Ron is generated by the adjusting current flowing through the adjusting current source 3264.

Figure 8:
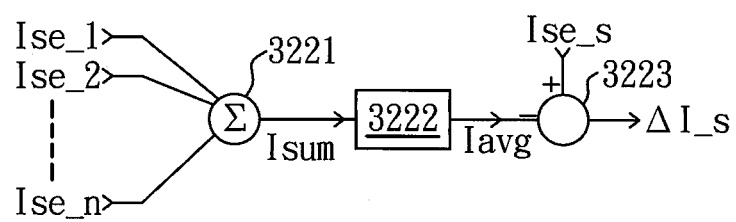
FIG. 8 is a schematic diagram of an error current generating circuit according to a first preferred embodiment of the present invention.

FIG. 8 is a schematic diagram of an error current generating circuit according to a first preferred embodiment of the present invention. The error current generating circuit comprises a current summing circuit 3221, a current average circuit 3222 and an error calculating circuit 3223. The current summing circuit 3221 receives the current detecting signals Ise_1~n for the channel currents to sum up all the channel currents and accordingly outputs a current summing signal Isum. The current average circuit 3222 receives the current summing signal Isum and accordingly outputs an average current signal Iavg to be as a target value. The error calculating circuit 3223 receives the average current signal Iavg and a current detecting signal Ise_s of the corresponding converting circuit of the present cycle, and outputs the adjusting current signal ΔI_s according to the difference there between. When the current detecting signal Ise_s is higher than the average current signal Iavg, the adjusting current signal ΔI_s controls the adjusting current source 3264 of the above mentioned embodiment to make the adjusting current source 3264 to output a positive current for increasing the amount of the charging current of the current supplying circuit or reducing the voltage level received by the inverting end of the comparator 3265. Thus, the on-time period in the present cycle is shortened to reduce the channel current of the corresponding converting circuit. On the other hand, when the current detecting signal Ise_s is lower than the average current signal Iavg, the adjusting current signal ΔI_s controls the adjusting current source 3264 of the above mentioned embodiment and make the adjusting current source 3264 output a negative current for reducing the amount of the charging current of the current supplying circuit or increasing the voltage level received by the inverting end of the comparator 3265. Thus, the on-time period in the present cycle is lengthened to increase the channel current of the corresponding converting circuit.

Figure 9:
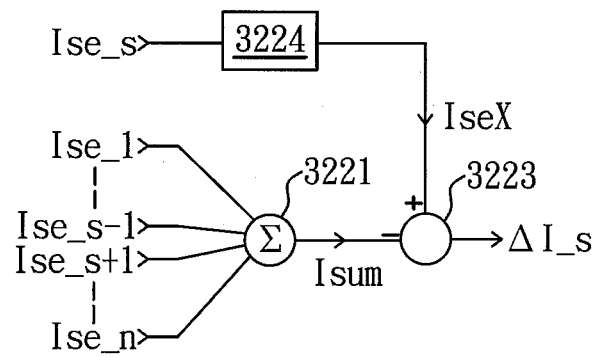
FIG. 9 is a schematic diagram of an error current generating circuit according to a second preferred embodiment of the present invention.

FIG. 9 is a schematic diagram of an error current generating circuit according to a second preferred embodiment of the present invention. The error current generating circuit comprises a current summing circuit 3221, an amplifying circuit 3224 and an error calculating circuit 3223. The current summing circuit 3221 receives the current detecting signal Ise_1~s−1 and Ise_s+1~n of the channel currents except for that of the corresponding converting circuit for summing up other channel currents and accordingly outputs a current summing signal Isum. The amplifying circuit 3224 receives the current detecting signal Ise_s of the corresponding converting circuit and outputs a current amplifying signal IseX by (n−1) times. Wherein the n is the number of total channels controlled by the multiphase converting circuit.

The error calculating circuit 3223 receives the current summing signal Isum and the current amplification signal IseX and accordingly outputs the adjusting current signal ΔI_s Compared with the embodiment shown in FIG. 8, the error current generating circuit of the present embodiment can make the adjusting current signal ΔI_s to noticeably reflect the difference between the corresponding channel current and other channel current.

In summary of that described in the above embodiments, the multiphase converter controller of the present invention uses a fixed on time technology to improve the transient response of the multiphase converting circuit. Moreover, the multiphase converter controller uses the single timer to determine the on time period for each channel circuit to reduce the complexity and the cost of the circuit, and also improves the definition of current balance due to mismatch among timers.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A multiphase converter controller with current balance, adapted to control a plural converting circuits and commonly supplying an output voltage, comprising:
   a feedback circuit, detecting the output voltage for generating a feedback control signal;
   a fixed on-time circuit, generating an on-time signal according to the feedback control signal, wherein the fixed on-time circuit only has a single timer, and a pulse width of the on-time signal is determined according to the single timer; and
   a multiphase logical circuit, generating a phase signal according to a sequence of the feedback control signal to choose a corresponding converting circuit among the plural converting circuits, and controlling the corresponding converting circuit according to the on-time signal;
   wherein the fixed on-time circuit receives a plurality of current detecting signals respectively indicating currents flowed through the plural converting circuits, and
   wherein the fixed on-time circuit determines correction values of the plural converting circuits according to the current detecting signals and the phase signal, and accordingly correct the pulse width of the on-time signal of the corresponding converting circuit, so that the multiphase logic circuit generates a corresponding control signal for controlling the corresponding converting circuit according to the corrected on-time signal.

2. The multiphase converter controller according to claim 1, wherein the single timer comprises:
   a capacitance;
   a current supplying circuit, adapted to generate a charge current charging the capacitance and determining to supply a charging current according to the currents of the phase signal and the current of the plural converting circuits and the phase signal to charge the capacitance; and
   a pulse width controller, determining a start point in time of the charging current charging the capacitance and the on-time signal according to the feedback control signal, and determining an end point in time of the on-time signal according to an on-time reference voltage and a voltage of the capacitance.

3. The multiphase converter controller according to claim 2, wherein the current supplying circuit comprises a constant current source and an adjusting current source, and the constant current source supplies a constant current and the adjusting current source supplies an adjusting current whose amount is determined according to a difference of the current of the corresponding converting circuit and an average current of the currents of the plural converting circuits.

4. The multiphase converter controller according to claim 2, wherein the current supplying circuit comprises a constant current source and an adjusting current, and the constant current source supplies a constant current and the adjusting current source supplies an adjusting current whose amount is determines according to the current of the corresponding converting circuit and a sum of the currents of other converting circuits of the plural converting circuits.

5. The multiphase converter controller according to claim 1, wherein the fixed on-time circuit comprises:
   a capacitance;
   a current source, providing a fixed constant charging current to charge the capacitance; and
   a pulse width controller, determining a start point in time of the charging current charging the capacitance and a start point in time of the on-time signal according to the feedback control signal, and determining an end point in time of the on-time signal according to an on-time reference voltage and a voltage of the capacitance, wherein the on-time reference voltage is determined according to the phase signal and the currents of the plural converting circuits.

6. The multiphase converter controller according to claim 5, wherein the on-time reference voltage is a sum of a constant base voltage and an adjusting voltage, and the adjusting voltage is determined according to a difference of the current of the corresponding converting circuit and an average current of the currents of the current of the plural converting circuits.

7. The multiphase converter controller according to claim 5, wherein the on-time reference voltage is a sum of a constant base voltage and an adjusting voltage, and the adjusting voltage is determined according to the current of the corresponding converting circuit and a sum of the currents of the other converting circuits of the plural converting circuits.

* * * * *